(12) United States Patent
Whelan

(10) Patent No.: US 7,832,103 B1
(45) Date of Patent: Nov. 16, 2010

(54) PORTABLE JIG ASSEMBLY AND METHOD FOR USE IN CONSTRUCTING SUSPENDED STRUT RACK SYSTEMS

(76) Inventor: Robert M. Whelan, 4 Stagecoach Rd., Boxford, MA (US) 01921

( * ) Notice: Subject to any disclaimer, the term of this patent is extended or adjusted under 35 U.S.C. 154(b) by 819 days.

(21) Appl. No.: 11/820,361

(22) Filed: Jun. 19, 2007

Related U.S. Application Data

(60) Provisional application No. 60/815,041, filed on Jun. 20, 2006.

(51) Int. Cl.
*B21D 47/00* (2006.01)
*B25B 1/20* (2006.01)
*F16L 3/08* (2006.01)
*F16L 3/22* (2006.01)

(52) U.S. Cl. .............. 29/897.31; 29/897.3; 269/40; 248/68.1; 248/70

(58) Field of Classification Search ............ 29/428, 29/445, 897.3, 897.31; 174/68.3, 72 R; 248/58, 248/59, 68.1, 70; 269/40, 45
See application file for complete search history.

(56) References Cited

U.S. PATENT DOCUMENTS 2,838,832 A * 6/1958 Potter .................. 29/428

* cited by examiner

*Primary Examiner*—David P Bryant
*Assistant Examiner*—Alexander P Taousakis
(74) *Attorney, Agent, or Firm*—William Nitkin

(57) ABSTRACT

A structure, method and kit for constructing suspended strut racks wherein jig members are disposed on support members parallel to one another, each of such jig members including channel member receipt areas for receipt of a channel member and receipt slots for receipt of pairs of square washers, lock washers and nuts, the apertures of which are aligned with a threaded rod receipt channels to allow for a threaded rod to be driven through the square washers, lock washers, nuts and through an aperture in a channel member to create a strut rack array to be suspended from a desired location.

1 Claim, 3 Drawing Sheets

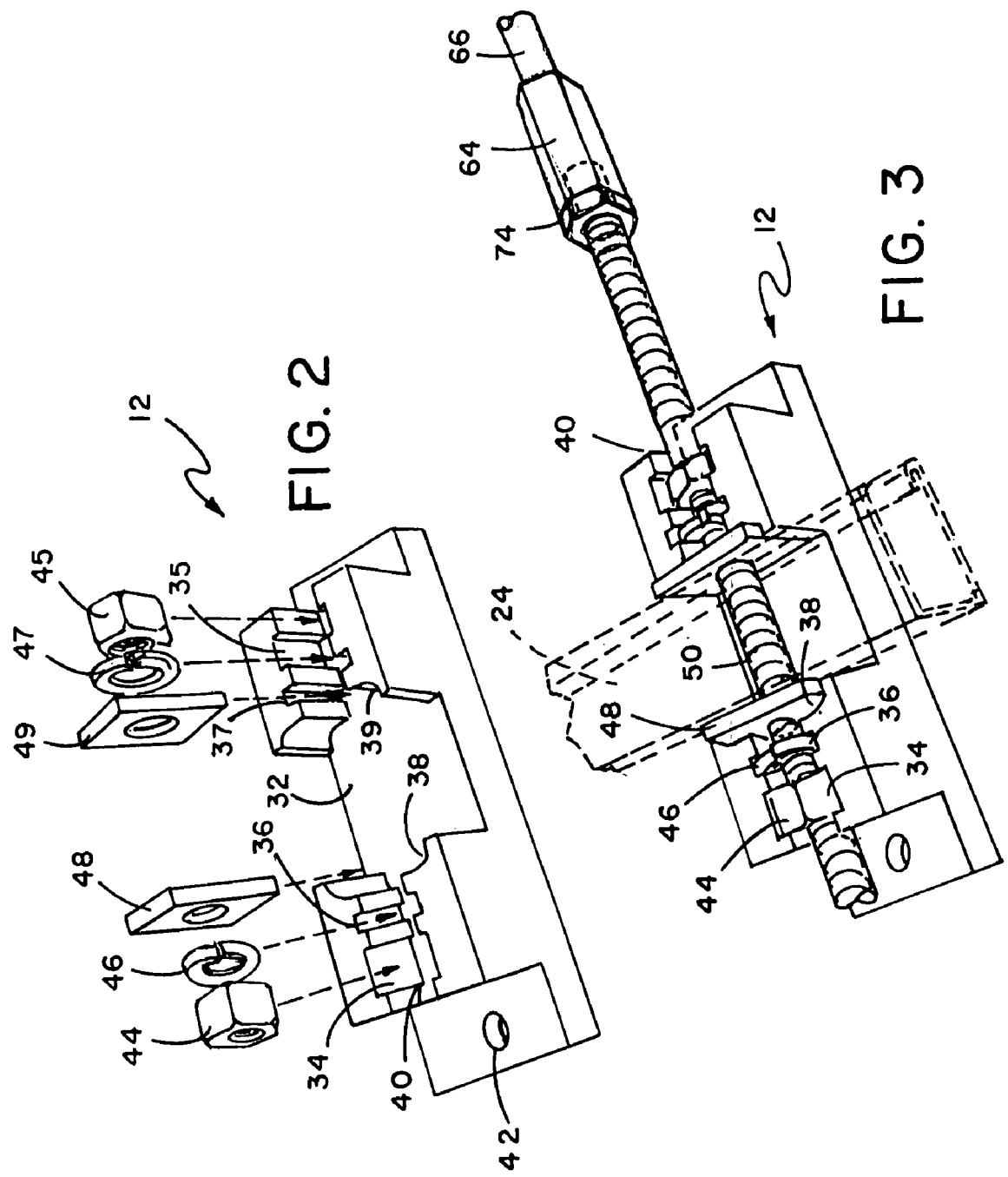

PORTABLE JIG ASSEMBLY AND METHOD FOR USE IN CONSTRUCTING SUSPENDED STRUT RACK SYSTEMS

This application claims priority and benefit of a provisional patent application entitled Portable Jig Assembly for Use in Constructing Suspended Strut Rack Systems, Ser. No. 60/815,041 filed Jun. 20, 2006, now pending.

BACKGROUND OF THE INVENTION

1. Field of the Invention

The device and method of this invention relate to a jig assembly and method for constructing suspended strut racks and more particularly relate to a jig assembly having multiple parts that are adjustable for receipt of channel members, nuts and associated hardware for their pre-assembly before installation in a building for supporting utility structures in such building.

2. History of the Prior Art

Metal framing systems used in building construction especially in large buildings are well known in the prior art. Such systems utilize an array of support structures for suspending conduits and other electrical components from the ceiling. A typical support structure consists frequently of a pair of threaded rods which are attached vertically to the ceiling and attached to these threaded rods are a plurality of horizontal channel members at different levels, forming what are referred to as trapeze-type support systems. These systems are installed by contractors who must build each support structure by hand by first taking each channel member and in multiple parallel locations on the threaded rods spacing them apart from one another by first manipulating in order a nut, a lock washer and a square washer above each channel member and immediately below the channel member in descending order a square washer, a lock washer and a nut. These nuts must be threaded by hand onto each threaded rod until the channel members are in their desired position on each threaded rod. The channel members are positioned at various heights on the threaded rods in a series so as to be able to hold multiple levels of conduits thereon. Once the metal framing system has been constructed by the manual rotating of each nut, followed by a lock washer and a square washer to surround and to hold each channel member in its desired location on the threaded rods, the threaded rods are then threaded into attachment members on the ceiling of the building and hang down therefrom. Conduits and other structures can then rest on the channel members.

It is a highly labor-intensive process for the nuts to be threaded from the end of each threaded rod up to their desired positions, and then the lock and square washers and channel members have to be pushed thereon with the then lower nuts threaded thereon by hand. Some threaded rods can be up to 10 feet in length so that a great deal of work is involved in threading each individual nut thereon. This process has to be performed multiple times for the desired number of channel members which are attached to the threaded rods. It is thus very costly and time-consuming to use the current method of installing channel members during building construction.

SUMMARY OF THE INVENTION

It is a object of this invention to provide a new system and method of constructing suspended strut rack systems that provide fast and easy threading of the nuts and positioning of lock and square washers around channel members on threaded rods in arrays for the threaded rods' later threading into attachment members on the ceiling of a building. The system of this invention provides a fast, automated way of constructing such strut rack systems for installation without the need for time-consuming manual threading of each nut up each long threaded rod which typically can be many feet in length. The channel member being used is the conventional three-sided channel member having an open top with the sides adjacent to the open top extending inward somewhat forming lips. The channel member on its bottom side has a plurality of apertures defined therein through one of which a threaded rod can pass.

The device and method of this invention in the embodiment illustrated utilize a plurality of pairs of jigs which are arrayed on a pair of support members and which support members are held spaced apart from one another on a pair of support structures, such as four-legged supports which are similar to sawhorses in appearance and tables. The jig assembly can be positioned on a table or a pair of tables, one at each end. Any equivalent supporting means will suffice. Each jig of a pair of jigs is positioned in its desired "tightened-in" position directly opposite one another on its respective support member. Each jig has a channel receipt area formed therein for receipt therein of one of the channel members on its side so that the channel member's apertures in the base of the channel member are disposed vertically to one side. A plurality of receipt slots are provided within each jig for receipt, respectively, of a square washer, a lock washer, and a nut in ascending and descending order on each side of the channel member receipt area. When all of the desired pairs of jigs with their associated hardware are in place on the support members, each of the threaded rods is then power-driven through an opening at one end of each jig; through a first nut, a first lock washer, a first square washer and then into a first channel member; through the aperture at the base of the channel member; and through a second square washer, a second lock washer and a second nut, etc. until the first threaded rod has passed through all of the aligned channel members and their associated hardware. The method is repeated for the second threaded rod. Because the threaded rod is driven by an electric motor or drill, it very quickly passes through each channel member and its associated hardware. The other embodiments can accommodate three or more threaded rods with multiple jigs arranged parallel to one another. The channel strut system can thus be very speedily constructed and suspended from a building's ceiling.

BRIEF DESCRIPTION OF THE DRAWINGS

FIG. 2 illustrates a perspective view of a jig with hardware shown disposed above their respective receipt slots.

FIG. 3 illustrates a perspective view of a threaded rod being power-driven through a jig and its associated hardware with the channel member shown in outline form.

DESCRIPTION OF THE PREFERRED EMBODIMENT(S)

Figure 1:
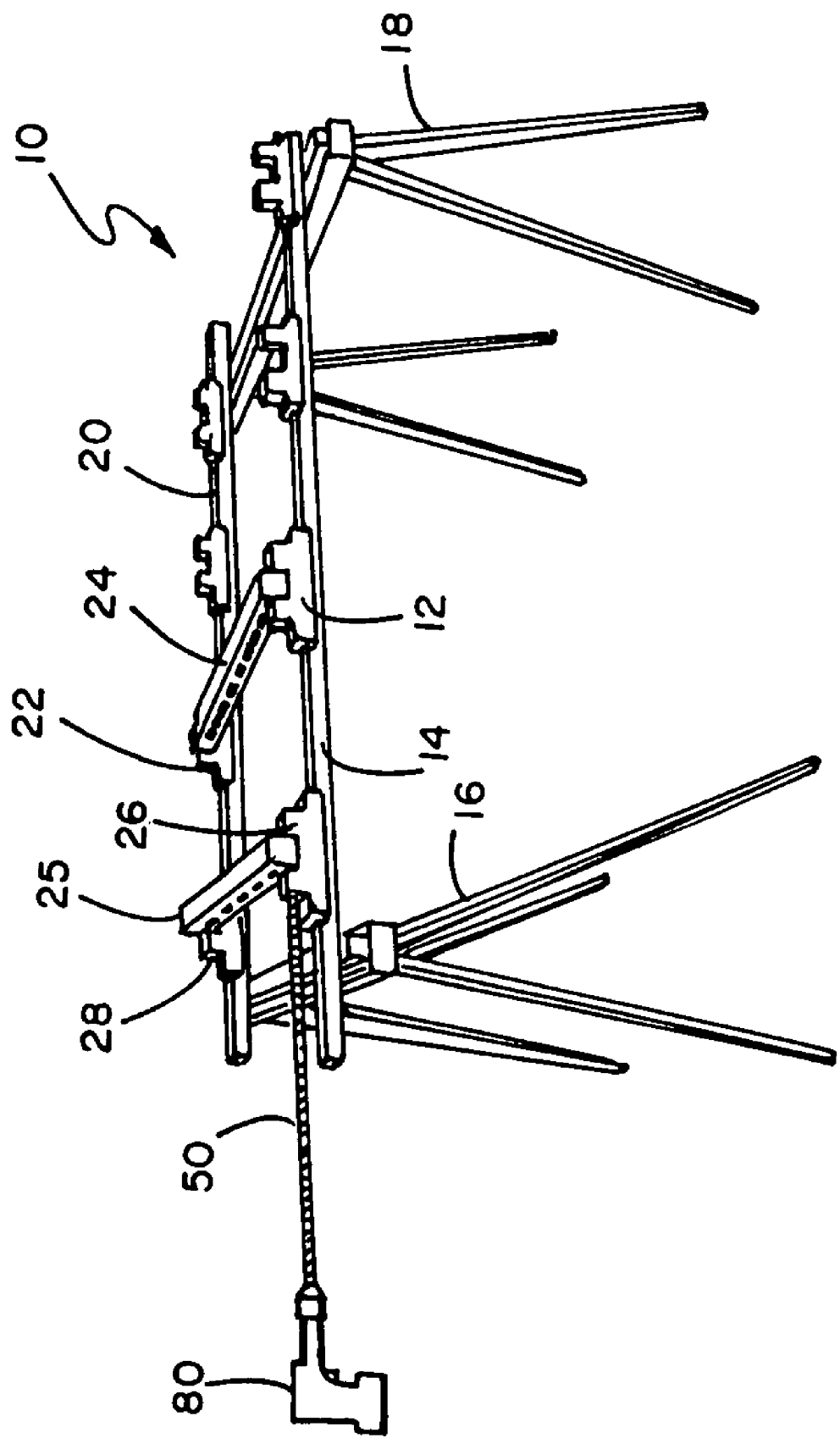
FIG. 1 illustrates a perspective view of a plurality of pairs of jigs arrayed on a pair of support members with two channel members in place in their respective channel receipt areas of one pair of jigs.
Figure 4:
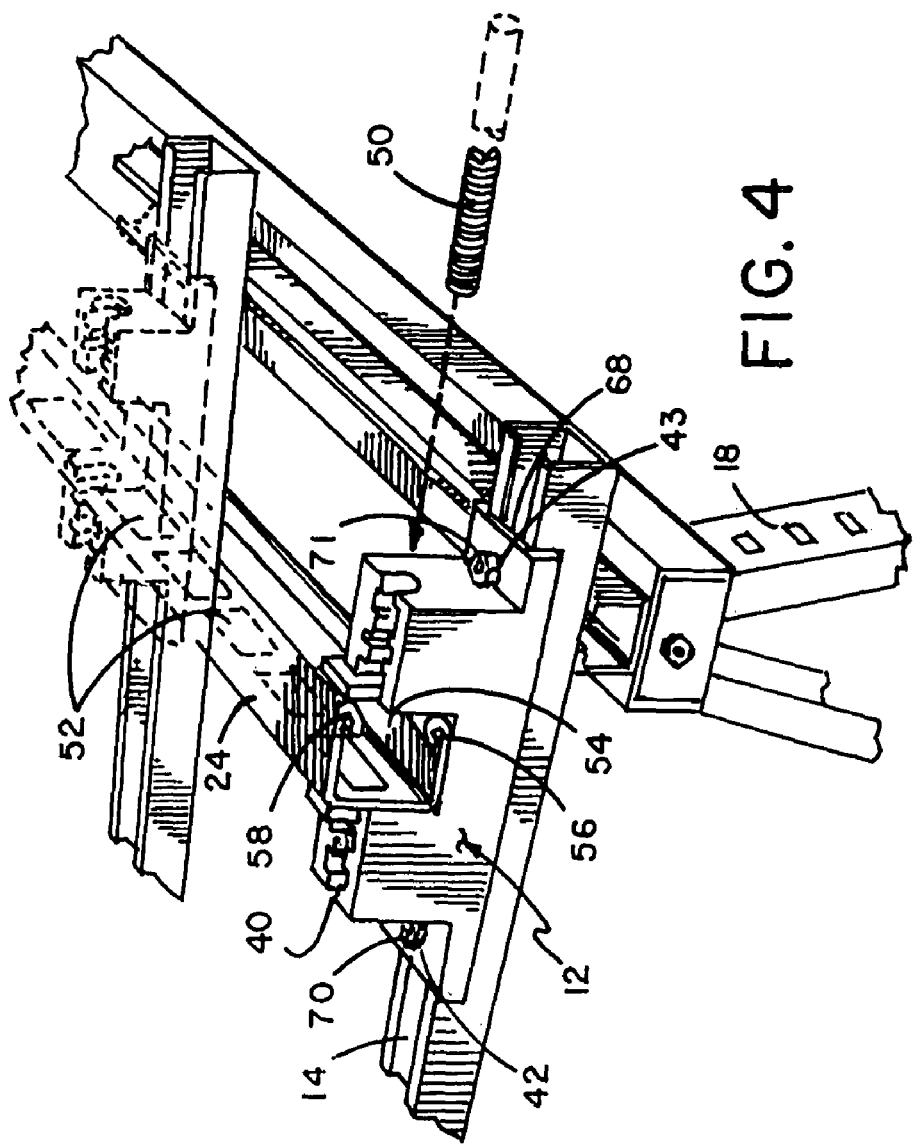
FIG. 4 illustrates a perspective view of a pair of jigs mounted on their respective support members, showing a threaded rod about to be driven through one jig having a channel member and its associated hardware in place and showing the second jig in outline form.

FIG. 1 illustrates a perspective view of jig assembly 10 of this invention showing a plurality of pairs of jigs such as first jig 12 and second jig 22 positioned, respectively, on first and second support members 14 and 20. First and second jigs 12 and 22 are positioned on first and second support members 14 and 20 in a desired array for constructing a strut rack system for suspension from the ceiling of a building. A receipt slot 68, as seen in FIG. 4, is defined in the bottom of each jig for receipt of a support member, allowing the jig to be moved along the support member until it is in its desired position thereon, such position corresponding to the position desired for each channel member when the strut rack system is completed and ready for suspension from the ceiling of a building. Engagement members which can be spring nuts, not seen but well known, are engaged to the bottom of bolts passing through first and second support channel engagement member apertures 42 and 43, as seen in FIG. 4, which are located, respectively, at each end of first jig 12, which can be tightened to hold first jig 12 in place on its support member 14. First jig 12 is designed to slide along first support member 14 by having first support member 14 fit within receipt slot 68 on the base of first jig 12. The jig is slid into its desired position and then first and second support channel engagement members 70 and 71, as seen in FIG. 4, are each tightened into a spring nut underneath lips 56 and 58, as seen in FIG. 4, at the top of first support member 14 so that the jig can be tightened in place securely on the support member. The pair of support members are supported on first and second support structures 16 and 18, as seen in FIG. 1. Extending parallel to first support member 14 is second support member 20 where second jig 22 is supported in a position that is opposite and parallel to first jig 12. First and second jig 12 and 22, as seen in FIG. 1, support first channel member 24. In a similar way third jig 26 is positioned opposite and parallel to fourth jig 28 to receive second channel member 25 therein which second channel member 25 is parallel to first channel member 24. Once the jigs are all locked into their desired positions, being in pairs that are opposite and parallel to one another, the channel members are positioned therein with their channel member apertures 52 all on the same side with the channel member openings 54 facing in the same direction. Then within the plurality of receipt slots formed in the top of each jig are positioned, for example as seen in FIG. 2, first and second square washers 48 and 49, first and second lock washers 46 and 47 and first and second nuts 44 and 45 which, respectively, fit into first and second square washer receipt slots 38 and 39, first and second lock washer receipt slots 36 and 37 and first and second nut receipt slots 34 and 35. In a similar way the other square washers, lock washers and nuts are slid into position in the third and fourth pairs of jigs, as seen in FIG. 1.

FIG. 3 illustrates a perspective view of threaded rod 50 being power-driven through a jig, shown separated from its support member, showing channel member 24 in outline form surrounded by its associated hardware in their respective receipt slots. As seen in FIG. 3, threaded rod 50 is positioned in threaded rod receipt channel 40 and is rotated by threaded rod engagement member 64 which acts as a driver. A check nut 74 will keep threaded rod 50 from tightly lodging in threaded rod engagement member 64. Threaded rod engagement member 64 is threaded onto the end of threaded rod 50 and can be driven by an electric drill, not shown, attached to bit 66 which is a portion of threaded rod engagement member 64. As the threaded rod is power-driven from one end to the other through the jig, it engages through a nut, a lock washer and a square washer and then passes through a channel member aperture, as seen in FIG. 4, and then through the next square washer, lock washer and nut until it has passed through the jig. The threaded rod continues through the remaining jigs, not shown, positioned on support member 14. The second threaded rod is then passed through the series of jigs on the opposite side positioned on the second support member. After both threaded rods have passed through their respective jigs, the strut rack system can be then lifted directly out of the jigs as all the nuts have been threaded into place quickly and efficiently without having to thread them on manually from an end of each threaded rod. The ends of the threaded rods can then be screwed into attachments on the ceiling of a building, thereby suspending in trapeze fashion a series of channel members thereunder which are parallel to one another; and the nuts can be tightened and locked into desired position in place on the threaded rods. Electrical or mechanical conduits or other structures can then be placed on each channel member, as desired.

As seen in FIG. 2, each jig is formed by having the first and second receipt slots 38 and 39 for receipt of a square washer defined within the channel member receipt area 32 which is in the central portion of the jig. In a preferred embodiment first and second lock washer receipt slots 36 and 37 for receipt of first and second lock washers 46 and 47 can be each approximately ⅛ of an inch in width. First and second nut receipt slots 34 and 35 for receipt, respectively, of first and second nuts 44 and 45 can each be approximately ½ inch in width, and the entire jig can be approximately 7½ inches in length and approximately 2 inches wide. The depths of the various receipt slots are such that the hardware contained therein center the threaded rod in a channel member aperture of the channel member.

Figure 5:
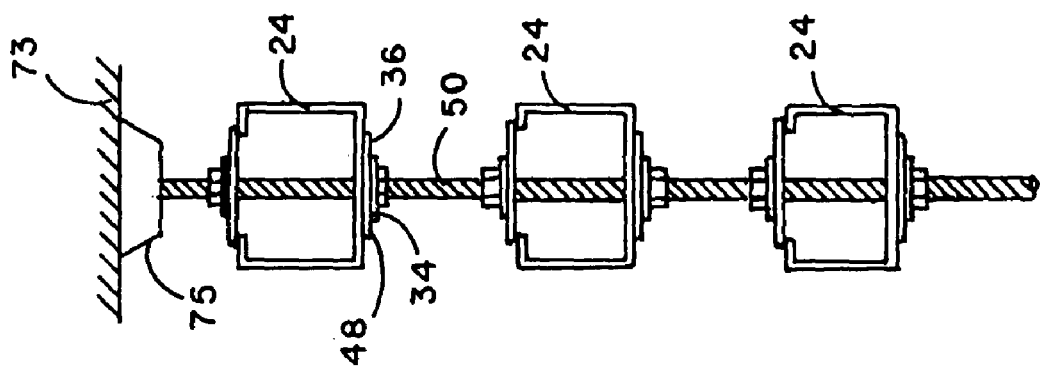
FIG. 5 illustrates a side view of a plurality of channel members attached in a rack array suspended from a ceiling member attached to a ceiling.

FIG. 5 illustrates a side view of a plurality of channel members attached in a rack array suspended from a ceiling member 75 attached to a ceiling 73 with threaded rod 50 screwed into and engaged to ceiling member 75.

The components of this invention can also be provided as a kit.

Also disclosed is a method of forming a suspended strut rack having a plurality of channel members having a plurality of apertures defined therein, such channel members being supported on threaded rods from a ceiling member with the channel members spaced apart from one another at desired distances. The method comprises the steps of providing at least one pair of support members, each support member of a pair disposed parallel to the other; providing at least one pair of jig members; slideably engaging each jig member of a pair, one jig member on each of the support members disposed opposite to the other; arraying the jig members on the support members to be aligned in sequence with the jig members of each pair disposed parallel to one another; defining channel member receipt areas in the tops of each of the jig members, each of the jig members having a length, a first end and a second end; positioning a channel member within the channel member receipt areas of each opposing pair of jig members such that the channel members are disposed perpendicular to the support members; aligning the channel members to be a desired distance from one another and parallel to one another; providing in sequence from the first end of each of the jig members to the second end a nut receipt slot, a lock receipt slot and a square washer receipt on one side of the channel member receipt area followed by a square washer receipt slot, a lock washer receipt slot and a nut receipt slot; positioning square washers in the square washer receipt slots; positioning lock washers in the lock washer receipt slots; positioning nuts in the nut receipt slots; providing a threaded rod receipt channel defined in the tops of each of the jig members along its length, such threaded rod receipt channel being aligned with the apertures in the nuts, lock washers and square washers; driving a threaded rod through the threaded rod receipt channels in the jig members arrayed on each support member, each threaded rod to engage through the aligned apertures in the square washers, lock washers and nuts and through a channel member aperture in each of the channel members; engaging the channel members together by the step of driving the threaded rods; lifting the threaded rods and attached channel members out of the jig members; and engaging the threaded rods into a selected ceiling member to create a suspended strut rack.

Although the present invention has been described with reference to particular embodiments, it will be apparent to those skilled in the art that variations and modifications can be substituted therefor without departing from the principles and spirit of the invention.

I claim:

1. A method of forming a suspended strut rack having a plurality of channel members having a plurality of apertures defined therein, said channel members supported on threaded rods from a ceiling member, said channel members spaced apart from one another at desired distances, comprising the steps of:

providing at least two support members, each support member disposed parallel to the other;

providing at least one pair of jig members;

slideably engaging each jig member of a pair, one jig member on each of the support members disposed opposite to the other;

arraying said jig members on said support members to be aligned in sequence with said jig member of each pair disposed parallel to one another;

defining channel member receipt areas in the tops of each of said jig members, each of said jig members having a length, a first end and a second end;

positioning a channel member within said channel member receipt areas of each opposing pairs of jig members such that said channel members are disposed perpendicular to said support members;

aligning said channel members to be a desired distance from one another and parallel to one another;

providing in sequence from said first end of each of said jig members to said second end a nut receipt slot, a lock receipt slot and a square washer receipt slot on one side of said channel member receipt area followed by a square washer receipt slot, a lock washer receipt slot and a nut receipt slot;

positioning square washers in said square washer receipt slots;

positioning lock washers in said lock washer receipt slots;

positioning nuts in said nut receipt slots;

providing a threaded rod receipt channel defined in said tops of each of said jig members along its length, said threaded rod receipt channel aligned with said apertures in said nuts, lock washers and square washers;

driving a threaded rod through said threaded rod receipt channels in said jig members arrayed on each support member, each threaded rod to engage through said aligned apertures in said square washers, lock washers and nuts and through a channel member aperture in each of said channel members;

engaging said channel members together by said step of driving said threaded rods;

lifting said threaded rods and attached channel members out of said jig members; and engaging said threaded rods into a selected ceiling member to create a suspended strut rack.

* * * * *